March 10, 1925.

A. F. BATCHELDER

RAILWAY TRUCK

Filed June 16, 1924

1,529,287

Inventor:
Asa F. Batchelder,
by *Alexander F. [signature]*
His Attorney.

Patented Mar. 10, 1925.

1,529,287

UNITED STATES PATENT OFFICE.

ASA F. BATCHELDER, OF SCOTIA, NEW YORK, ASSIGNOR TO GENERAL ELECTRIC COMPANY, A CORPORATION OF NEW YORK.

RAILWAY TRUCK.

Application filed June 16, 1924. Serial No. 720,216.

*To all whom it may concern:*

Be it known that I, ASA F. BATCHELDER, a citizen of the United States, residing at Scotia, in the county of Schenectady, State of New York, have invented certain new and useful Improvements in Railway Trucks, of which the following is a specification.

My invention relates to a railway truck construction and more particularly to a novel and useful arrangement and construction of the truck frame and the equalizing members of such a truck.

One of the objects of my invention is to provide a truck construction wherein additional resilient means are associated with resilient equalizing members so as to increase the flexibility and easy riding qualities of the truck. The arrangement which I have produced also results in a lighter and more compact construction than has heretofore been possible.

Figure 1:
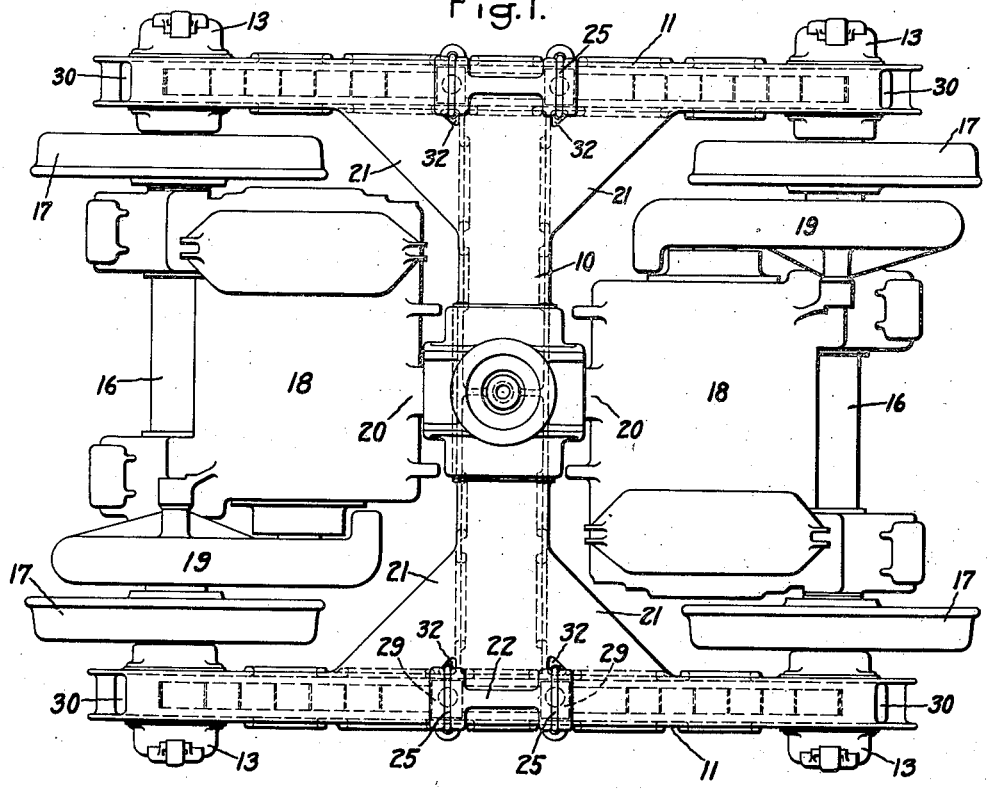
Figure 2:
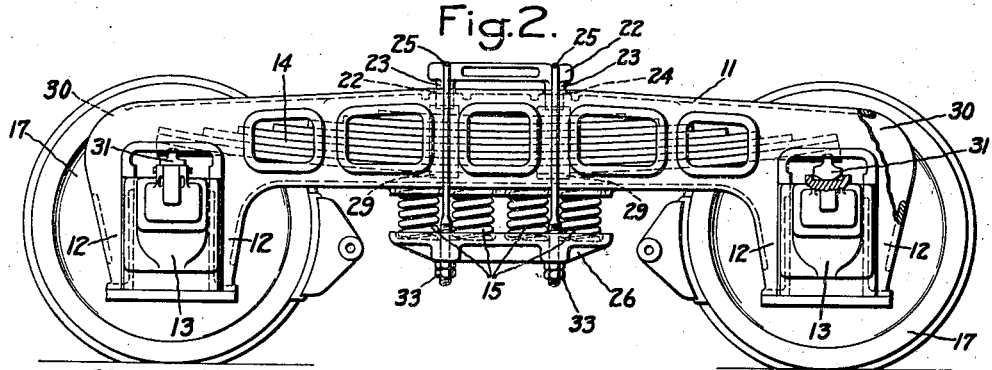
Figure 3:
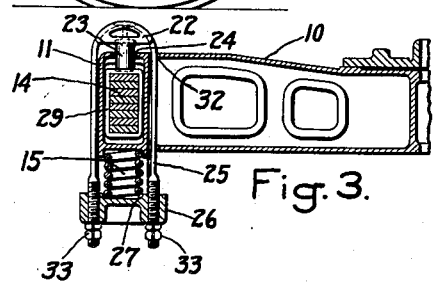

The features of novelty which characterize my invention will be pointed out with particularity in the claims annexed to and forming a part of this specification. For a better understanding of my invention, reference may be had to the following description taken in connection with the accompanying drawing in which Fig. 1 is a plan view of a truck embodying my invention; Fig. 2 is a side elevation partly in section, of the truck shown in Fig. 1; and Fig. 3 is a fragmentary sectional view showing the manner of supporting the frame upon the equalizing members.

In the drawing, my invention is shown as applied to a truck for electrically propelled cars having a truck frame comprising a transom 10 and hollow wheel pieces 11. The wheel pieces 11 are provided with pedestals 12 at each end which movably engage journal boxes 13. Extending through each of the hollow wheel pieces 11 is a resilient equalizing member 14 which in the preferred form is a leaf spring. The equalizing member 14 engages the journal boxes 13 at its ends and supports a second resilient means, shown in the drawing as helical springs 15, which engage the under side of the wheel piece 11 and resiliently support the truck frame upon the equalizing member 14.

The truck is provided with axles 16, the usual wheels 17 and electric motors 18. The motors are supported between the axles 16 and the transom 10 by means of journals upon the axles 16 and a lug 20 upon the motor frame which engages the transom 10. The motors 18 are connected to the axle 16 through suitable gearing 19. The transom 10 is shown as cast integral with the wheel pieces 11 and is provided with gussets or webs 21 which add to the rigidity of the truck frame. A saddle member 22 is supported upon the resilient equalizing member 14 above the wheel pieces 11 by means of tongues 23 which extend downwardly from the saddle 22 through openings 24 formed in the top of the wheel pieces 11. The tongues 23 are made sufficiently long to permit considerable relative movement of the parts without danger of the saddle 22 or the resilient equalizing member 14 engaging the wheel pieces 11. The saddle 22 carries stirrups 25 which hang downwardly along the outside of the wheel pieces 11 and support a spring seat 26. The spring seat 26 is provided with recesses 27 into which the helical springs 15 are seated. These helical springs 15 extend upwardly and engage the under side of the wheel pieces 11 and resiliently support the truck frame upon the equalizing member 14.

In the service for which the truck herein described is adapted, easy riding qualities are very desirable. To this end, I arrange the leaf springs 14 and the helical springs 15 so that they cooperate in carrying the load on the truck. The helical springs 15 being quicker in their action than the leaf spring 14, in the present arrangement compress considerably before the leaf spring is deflected any considerable amount. In this arrangement as stated the springs 14 and 15 carry substantially the total load of the truck, the helical springs providing the usual cushioning effect and the leaf spring 14 providing equalizing means between the journal boxes 13 and also serving to absorb the shocks occasioned by unevenness in the roadbed and the rail joints. From the above description it will be apparent that any relative movement between the wheel pieces 11 and the journal boxes 13 will cause an actuation of both the helical springs 15 and the leaf spring 14 since they at all times cooperate.

The resilient equalizing member 14 when in the form of a leaf spring is provided with bands 29 which surround the leaves of the spring and hold them in place. These bands 29 also provide a bearing for the tongues 23. In order to facilitate removal and repair of the resilient member 14, openings 30 are provided in the end of the wheel pieces 11 through which the member 14 can be inserted. The resilient member 14 is straight when inserted and will assume the position shown in Fig. 2 of the drawing when the truck is fully loaded. The journal boxes 13 are provided with movable supports 31 which permit longitudinal movement of the ends of the leaf spring 14 due to its deflection.

Referring to Fig. 3 the stirrups 25 hang over the saddle 22 with their ends depending along the outside of the wheel pieces 11, the inside stirrups extending through holes 32 in the gussets 21. The lower ends of the stirrups 25 are shown as threaded and projecting through the spring seat 26 and are provided with nuts 33 for securing the spring seat 26 in place.

By the above described arrangement, I have produced a truck having both leaf springs and helical springs which cooperate to spring support the greater portion of the weight of the truck. The leaf springs are slower in action and of different riding qualities than the helical springs and are arranged to equalize the load on the journal boxes. They also serve to absorb excessive shocks which otherwise might cause the helical springs to go solid and cause shocks to be transmitted to the car body. The amount of initial set in the springs may be adjusted in any suitable manner. In the particular arrangement shown, this adjustment is made by means of nuts 33, on the lower end of the stirrup 25.

While I have shown my invention as applied to a truck frame of cast construction having the wheel pieces and the transom cast integrally with each other, it should be understood that this is not a feature of my invention and that a suitable truck frame can be built in many other ways.

What I claim as new and desire to secure by Letters Patent of the United States, is,—

1. In a railway truck, the combination of a truck frame, journal boxes, a resilient equalizer supported at its ends upon said journal boxes, and resilient means intermediate the ends of said resilient equalizer for resiliently supporting said truck frame upon said equalizer.

2. In a railway truck, the combination of a truck frame, journal boxes, a resilient equalizer supported at its ends upon said journal boxes, and helical springs intermediate the ends of said resilient equalizer forming a spring support for said truck frame upon said equalizer.

3. In a railway truck, the combination of a truck frame, journal boxes, a resilient equalizer supported at its ends upon said journal boxes, and resilient means suspended below and intermediate the ends of said equalizer for supporting said truck frame upon said equalizer.

4. In a railway truck, the combination of a truck frame, journal boxes, a resilient equalizer supported at its ends upon said journal boxes, and helical compression springs suspended below and intermediate the ends of said equalizer for supporting said truck frame upon said equalizer.

5. In a railway truck frame having hollow wheel pieces, the combination of journal boxes movably mounted in said wheel pieces, a resilient equalizer extending through said hollow wheel pieces and engaging said journal boxes at its ends, and resilient means suspended from said resilient equalizer and below said hollow wheel piece for resiliently supporting said truck frame upon said equalizer.

6. In a railway truck frame having hollow wheel pieces, the combination of journal boxes movably mounted in said wheel pieces, a leaf spring equalizer extending through each of said hollow wheel pieces and engaging said journal boxes at its ends, and helical compression springs suspended from said resilient equalizer and below said hollow wheel pieces for resiliently supporting said truck frame upon said equalizer.

7. In a railway truck frame having hollow wheel pieces, the combination of journal boxes movably mounted in said wheel pieces, a resilient equalizing member extending through each of said hollow wheel pieces and engaging said journal boxes at its ends, a saddle having a tongue extending through the top of said wheel pieces and resting upon said equalizing member intermediate its ends, stirrups secured to said saddle and extending downwardly along the outside of said hollow wheel pieces, and a resilient means carried by said stirrups arranged to cooperate with said equalizing member and resiliently support said truck frame upon said journal boxes.

8. In a railway truck frame having hollow wheel pieces, the combination of journal boxes movably mounted in said wheel pieces, a resilient equalizing member extending through each of said hollow wheel pieces and engaging said journal boxes at its ends, a saddle having a tongue extending through the top of said wheel piece and resting upon said resilient equalizing member intermediate its ends, stirrups secured to said saddle and extending downwardly along the outside of said hollow wheel piece, and resilient means carried by said stirrups arranged to cooperate with said resilient equalizing member for resiliently supporting said truck frame.

9. In a railway truck frame having hollow wheel pieces, the combination of journal boxes movably mounted in said wheel pieces, a resilient equalizing member extending through each of said hollow wheel pieces out of contact therewith and engaging said journal boxes at its ends, and resilient means intermediate the ends of said resilient equalizing member for resiliently supporting said truck frame on said latter members.

10. In a railway truck frame having hollow wheel pieces, the combination of journal boxes movably mounted in said wheel pieces, a resilient equalizing member extending through each of said hollow wheel pieces and engaging said journal boxes at its ends, a saddle having a two point bearing upon and intermediate the ends of said resilient equalizing member, stirrups secured to said saddle and extending downwardly along the outside of said hollow wheel pieces, and resilient means carried by said stirrups engaging the under side of said wheel pieces for resiliently supporting said truck frame upon said resilient equalizing members.

In witness whereof, I have hereunto set my hand this 13th day of June, 1924.

ASA F. BATCHELDER.